United States Patent
Boggess et al.

(10) Patent No.: US 7,600,809 B2
(45) Date of Patent: Oct. 13, 2009

(54) CLIP TOWER FOR ENERGY ABSORPTION

(75) Inventors: Brian Boggess, Dublin, OH (US); Grant Foreman, Bellefontaine, OH (US); Matthew Seman, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 7 days.

(21) Appl. No.: 11/875,322

(22) Filed: Oct. 19, 2007

(65) Prior Publication Data
US 2009/0102217 A1    Apr. 23, 2009

(51) Int. Cl.
*B60R 13/04* (2006.01)
(52) U.S. Cl. .................................. 296/191; 24/289
(58) Field of Classification Search .............. 296/191, 296/164; 24/563, 662, 285, 289; 248/219.2, 248/27.1, 27.3; 280/728.2; 411/174, 112
See application file for complete search history.

(56) References Cited

U.S. PATENT DOCUMENTS

| | | | | |
|---|---|---|---|---|
| 3,197,935 | A * | 8/1965 | Clancy et al. | 24/297 |
| 3,208,119 | A * | 9/1965 | Seckerson | 24/295 |
| 4,422,222 | A * | 12/1983 | Notoya | 24/289 |
| 5,533,237 | A * | 7/1996 | Higgins | 24/289 |
| 5,542,158 | A * | 8/1996 | Gronau et al. | 24/289 |
| 5,546,288 | A * | 8/1996 | Van Order et al. | 362/490 |
| 5,833,480 | A * | 11/1998 | Austin | 24/295 |
| 5,934,729 | A | 8/1999 | Baack | |
| 6,049,952 | A | 4/2000 | Mihelich et al. | |
| 6,074,150 | A * | 6/2000 | Shinozaki et al. | 24/297 |
| 6,119,316 | A * | 9/2000 | Ishihara et al. | 24/289 |
| 6,132,154 | A | 10/2000 | Easter | |
| 6,406,236 | B1 | 6/2002 | Olson, Jr. | |
| 6,449,814 | B1 | 9/2002 | Dinsmore et al. | |
| 6,481,682 | B2 * | 11/2002 | Miura | 24/297 |
| 6,671,934 | B2 * | 1/2004 | Wenzlick et al. | 24/289 |
| 6,722,730 | B2 | 4/2004 | Lydan et al. | |
| 6,796,006 | B2 * | 9/2004 | Hansen | 24/289 |
| 6,854,790 | B2 | 2/2005 | Yoshida | |
| 6,908,144 | B2 | 6/2005 | Gotzinger et al. | |
| 6,928,705 | B2 * | 8/2005 | Osterland et al. | 24/289 |
| 6,932,416 | B2 | 8/2005 | Clauson | |
| 7,198,315 | B2 | 4/2007 | Cass et al. | |
| 7,231,696 | B2 * | 6/2007 | Asano et al. | 24/297 |
| 7,399,151 | B2 * | 7/2008 | Lubera et al. | 24/289 |
| 7,444,721 | B2 * | 11/2008 | Smith et al. | 24/297 |
| 7,461,436 | B2 * | 12/2008 | Asano | 24/297 |
| 2002/0043041 | A1 * | 4/2002 | Yoyasu | 52/716.5 |
| 2006/0168773 | A1 * | 8/2006 | Smith et al. | 024/295 |
| 2006/0267381 | A1 | 11/2006 | Cave et al. | |
| 2007/0189875 | A1 * | 8/2007 | Ooyama et al. | 411/45 |

* cited by examiner

*Primary Examiner*—Kiran B. Patel
(74) *Attorney, Agent, or Firm*—Rankin, Hill & Clark LLP; Mark E. Duell

(57) ABSTRACT

A vehicle body panel having an integrated mounting device for mounting the body panel to a vehicle substrate is provided. The integrated mounting device includes a tower portion with a U-shaped base and an extended portion, and a U-shaped spring clip. The base has an open front and back and includes two opposing side walls and a top. The top is a two-tiered top where a first tier has a width greater than a width of the second tier. The extended portion has an inverted U-shape and is an extension of the second tier and is adapted to receive the spring clip.

8 Claims, 2 Drawing Sheets

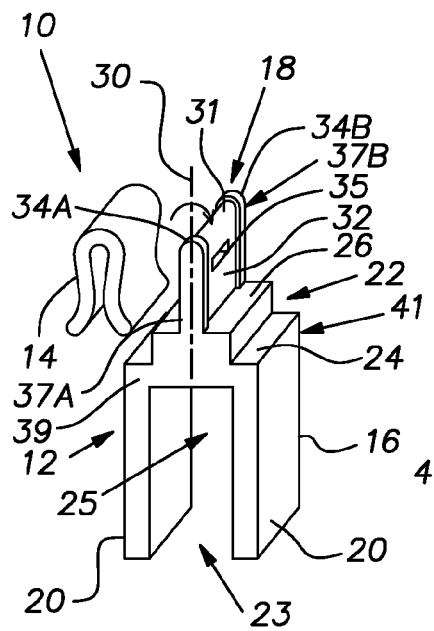
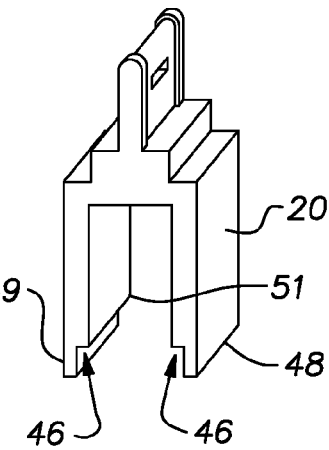
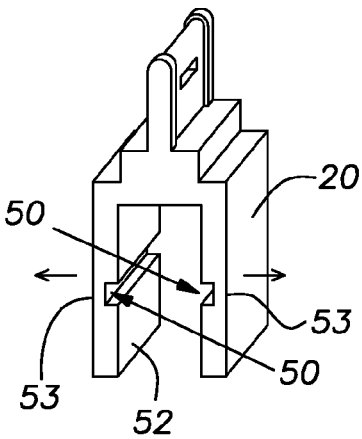
FIG. 1        FIG. 4A       FIG. 4B
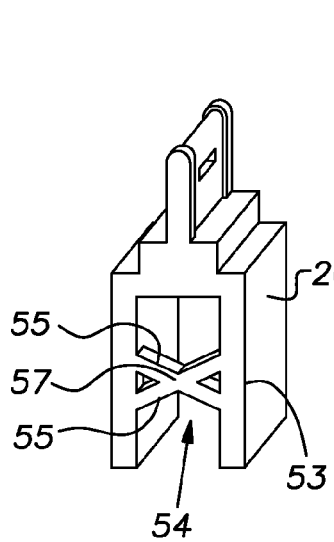
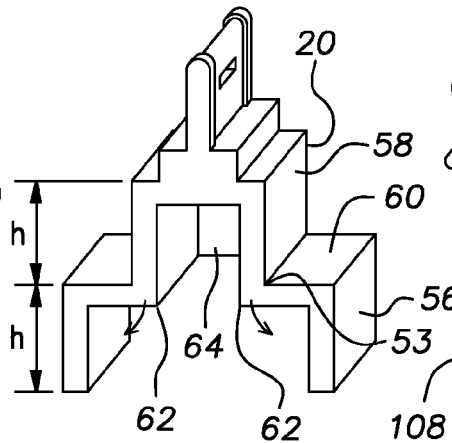
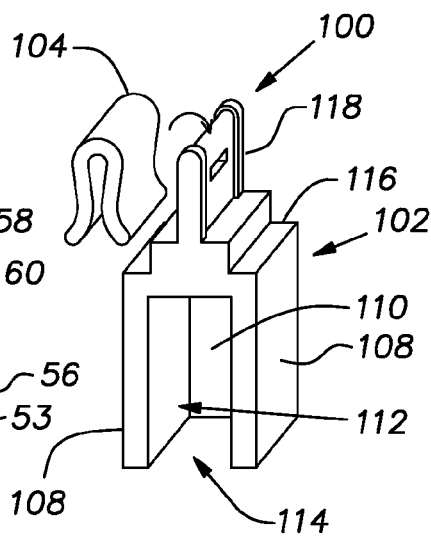
FIG. 4C       FIG. 4D       FIG. 5 PRIOR ART

CLIP TOWER FOR ENERGY ABSORPTION

BACKGROUND OF THE INVENTION

1. Field of the Invention

The present invention relates to an integrated fastener and more specifically to a clip tower, for attaching a plastic body panel to a body member or a secondary substrate in an automotive vehicle.

2. Description of Related Art

A clip tower must be designed to meet safety standards in the event of an impact due to a collision. More specifically, upon impact the clip tower must deform and dissipate the impact energy from the vehicle occupant. If the clip tower is overly stiff or rigid it will not deform enough to absorb the impact energy and, thus, fail safety requirements.

A conventional clip tower 100 is shown in FIG. 5 and is comprised of a tower portion 102 and a removable U-shaped spring clip 104. The tower portion 102 has a base including two side walls 108, a rear wall 110, an open front 112, an open bottom 114 and a two tiered-closed top 116. Extending in an upward direction from the top tier of the tiered top 116 is an extension portion 118 that receives the U-shaped spring clip 104. As viewed from the open front 112 of the base, the base has a wider profile than the stepped extension 118.

A disadvantage of the conventional clip tower 100 is that the base is too rigid or stiff and does not sufficiently deform so as to absorb energy due to an impact. As mentioned above, the clip tower must be designed to absorb the impact energy from an occupant so as to minimize the risk of injury to the occupant. If the clip tower cannot sufficiently absorb the impact energy then the clip tower will fail safety requirements.

Thus, what is required is an improved clip tower that overcomes the above disadvantage.

SUMMARY OF THE INVENTION

In accordance with one aspect, the present invention overcomes the above mentioned disadvantages by providing a vehicle body panel having an integrated mounting device for mounting the body panel to a vehicle substrate. The integrated mounting device includes a tower portion with a U-shaped base and an extended portion, and a U-shaped spring clip. The base has an open front and back and includes two opposing side walls and a top. The top is a two-tiered top where a first tier has a width greater than a width of the second tier. The extended portion has an inverted U-shape and is an extension of the second tier and is adapted to receive the spring clip.

In accordance with another aspect, the mounting device includes a notch defined on an inside-bottom portion of each side wall, wherein the notch extends from the front of each side wall to the rear of each side wall, and wherein the bottom portion of each side wall has a thickness that is less than a thickness other portions of the side wall.

In accordance with yet another aspect, the mounting device includes a channel defined at an approximate midpoint of each side wall, wherein the channels extend from the front of each side wall to the rear of each side wall, wherein the approximate midpoint of each side wall has a thickness that is less than a thickness less than the other portions of the side wall, and wherein in the event of a load impact to the body panel the mounting device deforms such that the midpoint of each side wall is displaced in a vertical-outward direction thereby allowing the mounting device to deform and absorb the load impact energy.

In accordance with still another aspect, the mounting device includes a cross brace located at an approximate midpoint on either the front or back of the base, wherein the cross brace includes two cross members intersecting at their approximate midpoints thereby forming an X-shape, wherein the cross brace extends from one side wall to the other side wall thereby providing a connection between each side wall, and wherein in the event of a load impact to the body panel the cross brace allows the base to deform such that the mounting device absorbs the load impact energy.

In accordance with still another aspect, the side wall of the mounting device includes a lower portion and an upper portion, wherein the lower portion is wider than the upper portion thereby forming a step between the lower portion and the upper portion, wherein a height of the lower portion is approximately the same as a height of the upper portion, and wherein in the event of a load impact to the body panel the mounting device deforms such that a bottom portion of the upper portion moves in a downwardly arcurate path thereby allowing the mounting device to deform and absorb the load impact energy.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

FIG. 1 is a perspective view of a clip tower in accordance with the present invention.

FIGS. 4A-4D are perspective views of alternative embodiments of the clip tower in accordance with the present invention.

FIG. 5 is a perspective view of a conventional clip tower.

DETAILED DESCRIPTION OF THE INVENTION

Figure 2:
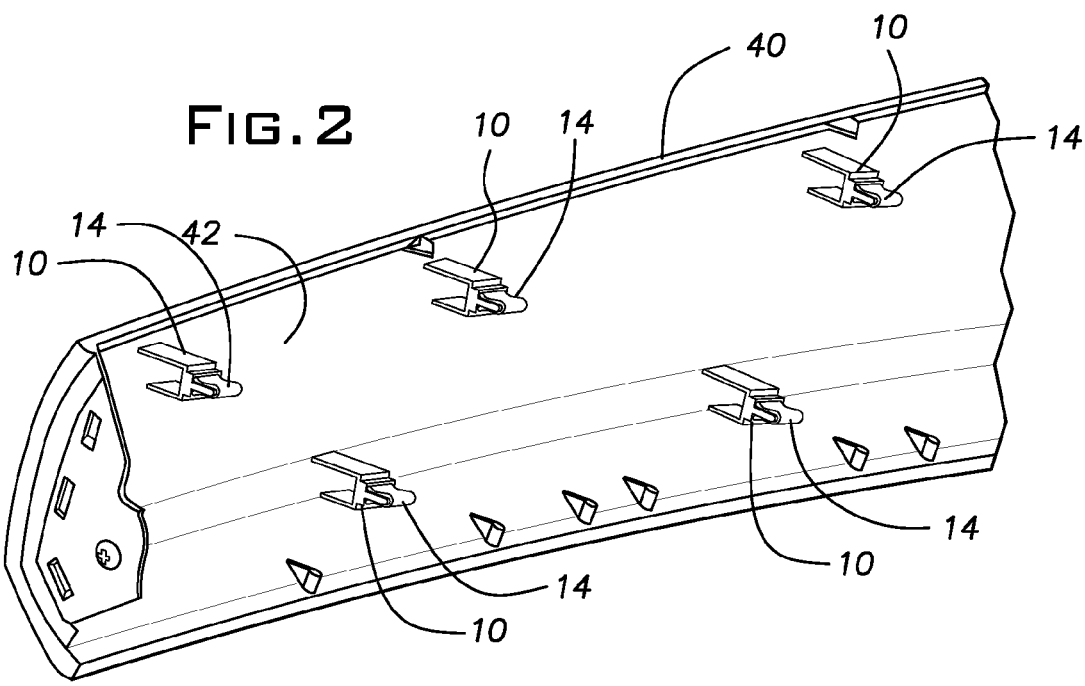
FIG. 2 is a rear perspective of a body panel illustrating the arrangement of multiple clip towers in accordance with the present invention.

Referring now to the drawings, FIG. 1 shows an example embodiment of a mounting device and more specifically a clip tower 10 in accordance with the present invention. The clip tower 10 is comprised of a tower portion 12 and a U-shaped spring clip 14. The tower portion 12 is an integrated component and includes a base 16 and an extended portion 18. The base 16 has a U-shaped cross section and includes a two side walls 20 and a multi-tiered upper portion 22. Further, the base 16 has an open front 23 and an open back 25.

The multi-tiered upper portion 22 is comprised of a first tier 24 and a second tier 26. The first tier 24 connects the side walls 20 thereby forming the U-shaped cross section of the base 16. As viewed from the front 23 of the clip tower 10, the second tier 26 has a width less than a width of the first tier 24. Thus, the first 24 and second 26 tiers form a step on either side of the multi-tiered upper portion 22.

The extended portion 18 is situated on the second tier 26 on a longitudinal axis 30 of the clip tower 10. The extended portion 18 extends upward from the second tier 26, but, as viewed from the front 23 of the clip tower 18, the extended portion 18 has a width less than the width of the second tier 26. The extended portion 18 has an inverted U-shape comprising two flat side walls 32 and a rounded top portion 31 and is adapted to receive the U-shaped spring clip 14. The extended portion 18 extends from the front 23 of the clip tower 10 to the back 25 of the clip tower 10 and includes a front ridge 34A and a rear ridge 34B. The front ridge 34A and the rear ridge 34B are situated on the extended portion 18 such that an outside surface 37A of the front ridge 34A is flush with a front surface 39 of the base 16. Similarly, the rear ridge 34B is situated on the extended portion 18 in an identical fashion as the front ridge 34A such that an outside surface 37B of the rear ridge 34B is flush with a rear surface 41 of the base 16. The front 34A and rear 34B ridge prevent the spring clip 14 from sliding in a front/rear direction. In addition, the extended portion 18 includes a slot 35 defined in each side wall 32. A tab 43, shown in FIG. 3B, located on an inside surface of each side wall of the spring clip 14 engages the slot 35 thereby securing the spring clip 14 to the extended portion 18.

Referring to FIG. 2, FIG. 2 shows a typical automotive garnish or body panel 40 incorporating the inventive clip tower 10. Specifically, FIG. 2 shows a rear side 42 of the body panel 40 illustrating the arrangement of multiple clip towers 10. The clip towers 10 are an integrated portion of the body panel 40 and extend vertically away from the rear side 42 of the body panel 40.

Figure 3A:
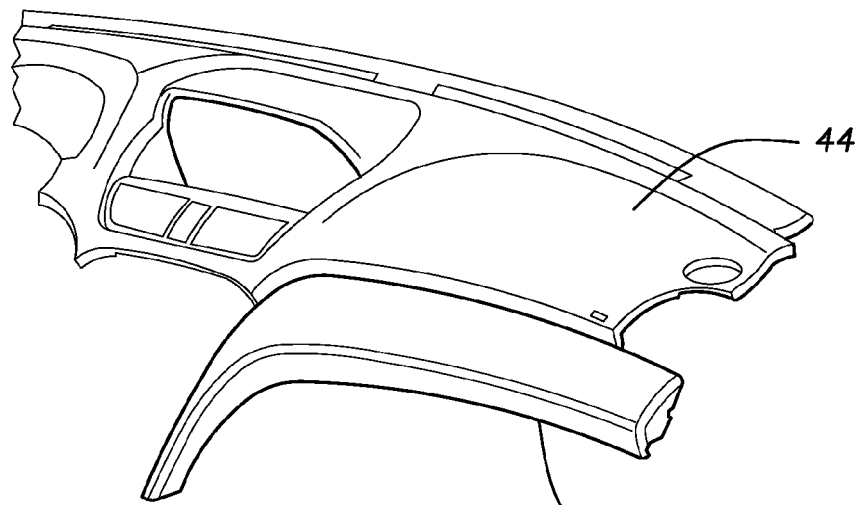
FIG. 3A is a perspective view of the body panel connected to a body member panel.
Figure 3B:
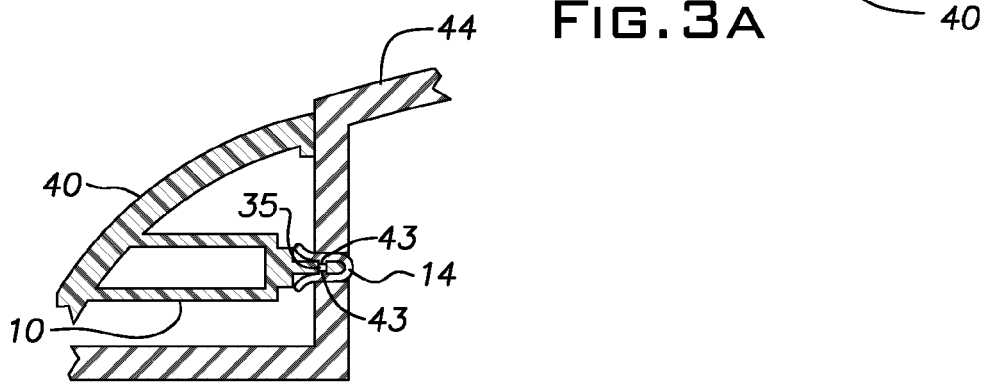
FIG. 3B is a cross section of FIG. 3A showing the connection between the body panel and the body member panel.

Referring to FIGS. 3A and 3B, FIGS. 3A and 3B show the body panel 40 attached to a body member 44 or vehicle substrate. In the embodiment shown in FIGS. 3A and 3B, the body panel 40 is a dashboard panel and the body member 44 is a dashboard body member. It should be noted, however, that the present invention can be incorporated with any type of body panel and body member associated with the vehicle. Thus, the embodiment shown in FIGS. 2, 3A, and 3B is for illustrative purposes only and is not intended to limit the scope of the invention. When the body panel 40 is installed onto the body member 44 the clip tower 10 engages openings or slots in the body member 44 thereby securing the body panel 40 to the body member 44.

As mentioned above, the front 23 and rear 25 portion of the base 16 are open. Thus, the embodiment shown in FIG. 1 does not include the rear wall as in the conventional clip tower 100 described above. Because the base 16 in the inventive clip tower 10 has only two walls (the two side walls 20) as opposed to the three walls (the two side walls 108 and the rear wall 110) in the conventional base 106, the clip tower 10 of the present invention is less rigid than the base in the conventional clip tower 100. Therefore, the inventive clip tower 10 is more prone to deform and absorb the energy due to an impact from the vehicle occupant thereby minimizing the injury to the vehicle occupant.

FIGS. 4A-4D show alternative example embodiments of the inventive clip tower 10. The example embodiments shown in FIGS. 4A-4D are similar to the example embodiment shown in FIG. 1. Thus, in describing the following example embodiments all like parts will have the same reference number of the clip tower 10 described in FIG. 1 and will not be repeated. Further, for simplicity the U-shaped spring clip 14 is not shown in FIGS. 4A-4D.

The clip tower 10 in FIG. 4A is modified such that a notch 46 is defined on the inside of a bottom portion 48 of each side wall 20. The notch 46 extends from a front 49 to a rear 51 of each side wall 20. Thus, the bottom portion 48 of each side wall 20 has a thickness that is less than a thickness of the side wall 20.

The clip tower 10 in FIG. 4B includes a channel 50 cutout from an inside surface 52 of each side wall 20. The channels 50 are located at an approximate midpoint 53 of each side wall 20 and extend from the front 49 of the side wall 20 to the rear 51 of the side wall 20. Thus, the midpoint of each side wall 20 is thinner than the other portions of the side wall 20. In the event of a load impact to the body panel 40, each side wall 20 will buckle and deform in a manner such that the midpoint of each side wall 20 will move in a vertical-outward direction as indicated by the arrows thereby allowing the clip tower 10 to deform and absorb the load impact energy.

The clip tower 10 in FIG. 4C includes a cross brace 54 located at the approximate midpoint 53 on the front 23 of the base 16 that provides a connection between each side wall 20. It should be noted that the cross brace 54 can be located in either the front 23 of the base 16 or the rear 23 of the base 16. The cross brace 54 is an integrated portion of the clip tower 10 and includes two cross members 55 that intersect at their midpoints 57 to thereby forming an X-shape. The cross brace 54 can be used for support between the two side walls 20 in lieu of a rear wall where additional support is required under certain applications. The cross brace 54, however, can have a thickness that is less than a thickness of the side walls 20 and a thickness of the rear wall 110 in the conventional clip tower 100 described above. In the event of a load impact to the body panel 40, the presence of the cross brace 54 as opposed to a stiff rear wall allows the clip tower 10 to deform and absorb the load impact energy.

The clip tower 10 in FIG. 4D is modified to include a stepped side wall design. Each side wall 20 includes a lower portion 56 and an upper portion 58 whereby the lower portion 56 is wider than the upper portion 58 thereby forming a step 60 between the lower 56 and upper 58 portions. The thickness of each side wall 20, however, remains the same. The step 60 is located approximately at the midpoint 53 of the side wall 20, thus a height (h) of the lower portion 56 is approximately equal to a height (h) of the upper portion 58. In the event of a load impact to the body panel 40 each side wall 20 will deform such that a bottom 62 of the upper portion will collapse in a downward-arcurate path as indicated by the arrows thereby allowing the clip tower 10 to deform and absorb the load impact energy. An optional rear wall 64 for the upper portion 58 may be included to provide additional support to each side wall 20.

While specific embodiments of the invention have been described and illustrated, it is to be understood that these embodiments are provided by way of example only and that the invention is not to be construed as being limited but only by proper scope of the following claims.

What is claimed is:

1. A mounting device for mounting a body panel to a vehicle substrate comprising:
   a tower portion comprised of a U-shaped base and an extended portion; and
   a spring clip having a U-shaped cross section,
   wherein the base has an open front and an open back and includes two opposing side walls and an upper portion, the upper portion having a first tier and a second tier,
   wherein the first tier has a width greater than a width of the second tier, and
   wherein the extended portion has an inverted U-shape and extends upward from the second tier and is adapted to receive the spring clip.

2. The mounting device of claim 1, wherein the mounting device is an integrated portion of the body panel and extends vertically away from a rear side of the body panel.

3. The mounting device of claim 2, wherein the extended portion extends from the open front of the base to the open back of the base and wherein the extended portion includes a front ridge and a rear ridge such that an outside surface of the front ridge and an outside surface of the rear ridge are flush with a front surface and a rear surface of the base respectively.

4. The mounting device of claim 3, wherein a notch is defined on an inside-bottom portion of each side wall, wherein the notch extends from a front of each side wall to a rear of each side wall, and wherein the bottom portion of each side wall has a thickness that is less than the thickness of other portions of the side wall.

5. The mounting device of claim 3, wherein a channel is defined at an approximate midpoint of each side wall, wherein the channels extend from the front of each side wall to the rear of each side wall, wherein the approximate midpoint of each side wall has a thickness that is less than the thickness of the other portions of the side wall.

6. The mounting device of claim 3 further comprising a cross brace located at the approximate midpoint on either the open front or open back of the base, wherein the cross brace includes two cross members intersecting at their approximate midpoints thereby forming an X-shape, wherein the cross brace extends from one side wall to the other side wall thereby providing a connection between each side wall.

7. The mounting device of claim 3, wherein the side wall includes a lower portion and an upper portion, wherein the lower portion is wider than the upper portion thereby forming a step between the lower portion and the upper portion, wherein a height of the lower portion is approximately the same as the height of the upper portion.

8. The mounting device of claim 7, wherein the upper portion includes a rear wall to provide additional support to each side wall.

* * * * *